United States Patent
Burgess (10) Patent No.: US 10,378,557 B2
(45) Date of Patent: Aug. 13, 2019

(54) REDUCED NOISE COMPRESSOR RECIRCULATION

(71) Applicant: BorgWarner Inc., Auburn Hills, MI (US)

(72) Inventor: Mark Burgess, Bradley Keighley (GB)

(73) Assignee: BorgWarner Inc., Auburn Hills, MI (US)

( * ) Notice: Subject to any disclaimer, the term of this patent is extended or adjusted under 35 U.S.C. 154(b) by 458 days.

(21) Appl. No.: 15/101,020

(22) PCT Filed: Nov. 20, 2014

(86) PCT No.: PCT/US2014/006498
§ 371 (c)(1),
(2) Date: Jun. 2, 2016

(87) PCT Pub. No.: WO2015/084593
PCT Pub. Date: Jun. 11, 2015

(65) Prior Publication Data
US 2016/0305453 A1    Oct. 20, 2016

Related U.S. Application Data

(60) Provisional application No. 61/912,646, filed on Dec. 6, 2013.

(51) Int. Cl.
*F04D 29/68* (2006.01)
*F02M 35/12* (2006.01)
(Continued)

(52) U.S. Cl.
CPC ............ *F04D 29/685* (2013.01); *F02B 37/12* (2013.01); *F02B 39/00* (2013.01);
(Continued)

(58) Field of Classification Search
CPC ............... F04D 29/4213; F04D 29/685; F02B 2037/125
See application file for complete search history.

(56) References Cited

U.S. PATENT DOCUMENTS 5,246,335 A * 9/1993 Mitsubori ........... F04D 29/4213
                                                           415/214.1
5,333,990 A * 8/1994 Foerster .............. F04D 29/4213
                                                            415/58.4
(Continued)

FOREIGN PATENT DOCUMENTS

DE   102009058102 A1   6/2011
EP       2194279 A1    6/2010
(Continued)

OTHER PUBLICATIONS

International Search Report and Written Opinion; dated Mar. 19, 2015; for International Application No. PCT/US2014/066498; 12 pages.

*Primary Examiner* — Jason D Shanske
*Assistant Examiner* — Brian O Peters
(74) *Attorney, Agent, or Firm* — BrooksGroup (57) ABSTRACT

An air flow-enhancing insert (30) is configured to be inserted into the air inlet (16) of a compressor (3). The insert includes a hollow, cylindrical inner member (32) and lugs (44) protruding outward from an outer surface (36) of the inner member, each lug having an elongated cross sectional shape and including a leading edge (46), a trailing edge (48), and a long axis (50) that extends between the leading edge and trailing edge, the long axis defining a helix about the outer surface. When the insert (30) is disposed in the compressor air inlet, an air recirculation path (20) is defined between the inner member outer surface, an inner surface (17) of the air inlet, and the lugs. The air recirculation path (Continued)

improves air flow in the compressor, whereby compressor efficiency is improved and noise is reduced.

16 Claims, 8 Drawing Sheets

(51) Int. Cl.
  *F04D 29/28*   (2006.01)
  *F02B 39/00*   (2006.01)
  *F04D 29/42*   (2006.01)
  *F04D 25/04*   (2006.01)
  *F02B 37/12*   (2006.01)

(52) U.S. Cl.
  CPC ....... *F02M 35/1288* (2013.01); *F04D 25/045* (2013.01); *F04D 29/284* (2013.01); *F04D 29/4213* (2013.01); *Y02T 10/144* (2013.01)

(56) References Cited

U.S. PATENT DOCUMENTS

| | | | |
|---|---|---|---|
| 6,164,911 | A | 12/2000 | Leblanc et al. |
| 7,475,539 | B2 * | 1/2009 | Chen .................... F04D 29/4213 |
| | | | 415/144 |
| 8,272,832 | B2 * | 9/2012 | Yin ....................... F04D 29/444 |
| | | | 415/191 |
| 2005/0163606 | A1 | 7/2005 | Svihla et al. |
| 2008/0056882 | A1 | 3/2008 | Clay et al. |
| 2011/0011379 | A1 | 1/2011 | Jackson |
| 2015/0377240 | A1 * | 12/2015 | Nasir ....................... F02C 6/12 |
| | | | 417/405 |

FOREIGN PATENT DOCUMENTS

| | | |
|---|---|---|
| JP | 2005023792 A | 1/2005 |
| JP | 2007127109 A | 5/2007 |
| JP | 2010168916 A | 8/2010 |

* cited by examiner

REDUCED NOISE COMPRESSOR RECIRCULATION

CROSS-REFERENCE TO RELATED APPLICATION

This application claims priority to and all the benefits of U.S. Provisional Application No. 61/912,646, filed on Dec. 6, 2013, and entitled "Reduced Noise Compressor Recirculation," which is incorporated herein by reference.

FIELD OF THE INVENTION

The invention relates to a turbocharger with an improved compressor and more particularly, to a compressor inlet duct including an air flow-enhancing insert.

BACKGROUND OF THE INVENTION

Exhaust gas turbochargers are provided on an engine to deliver air to the engine intake at a greater density than would be possible in a normal aspirated configuration. This allows more fuel to be combusted, thus boosting the engine's horsepower without significantly increasing engine weight.

Generally, an exhaust gas turbocharger includes a turbine section and a compressor section, and uses the exhaust flow from the engine exhaust manifold, which enters the turbine section at a turbine inlet, to drive a turbine wheel located in the turbine housing. The turbine wheel drives a compressor wheel located in the compressor section via a shaft that extends between the sections. Air compressed by the compressor section is then provided to the engine intake as described above.

The compressor section of the turbocharger includes the compressor wheel and its associated compressor housing. Filtered air is drawn axially into a compressor air inlet which defines a passage extending axially to the compressor wheel. Rotation of the compressor wheel forces pressurized air flow radially outwardly from the compressor wheel into a compressor volute for subsequent pressurization and flow to the engine.

SUMMARY

In some aspects, an air flow-enhancing insert is configured to be inserted into the air inlet of a compressor. The insert includes a hollow, cylindrical inner member including a longitudinal axis and an outer surface, and lugs protruding outward from the outer surface of the inner member. Each lug has an elongated cross sectional shape and includes a leading edge, a trailing edge, and a long axis that extends between the leading edge and the trailing edge. The long axis defines a helix about the outer surface, and when the air flow-enhancing insert is disposed in the air inlet, an air recirculation channel is defined between the inner member outer surface, an inner surface of the air inlet, and the lugs.

The air flow enhancing insert may include one or more of the following features: The lugs are arranged so that the leading edge of one lug overlaps the trailing edge of an adjacent lug as seen when viewed along a line parallel to the longitudinal axis. The insert includes an outer member that surrounds the inner member, and a proximal end of each lug is connected to the inner member, and a distal end of each lug is connected to the outer member. The outer diameter of the outer member corresponds to an inner diameter of the compressor air inlet. Each lug defines a modified helix about the outer surface. The lugs are equidistantly spaced about the outer surface. The air inlet facing edge of the inner member is rounded to facilitate smooth air flow about the inner member.

In some aspects, the air flow-enhancing insert includes a hollow, cylindrical member having a longitudinal axis and an outer surface shaped and dimensioned to be fitted inside the compressor air inlet, and a groove formed in the outer surface that extends along a helical path. When the air flow-enhancing insert is disposed in the air inlet, the groove defines an air recirculation channel between the outer surface and an inner surface of the compressor air inlet.

The air flow-enhancing insert may include one or more of the following features: The groove comprises a first helical groove arranged at a first angle relative to the longitudinal axis, and a second helical groove arranged at a second angle relative to the longitudinal axis, where the second angle is different from the first angle. The groove comprises a first helical groove arranged at a first angle relative to the longitudinal axis, and a second helical groove arranged at a second angle relative to the longitudinal axis, where the second angle is the negative of the first angle. The groove comprises groove pairs disposed on diametrically opposed sides of the member, each groove pair comprising a first helical groove arranged at a first angle relative to the longitudinal axis, and a second helical groove arranged at a second angle relative to the longitudinal axis, where the second angle is the negative of the first angle.

In some aspects, a noise attenuation device is configured to be inserted into compressor air inlet adjacent a compressor wheel. The noise attenuation device includes a hollow cylindrical body including an air inlet-facing end; a wheel-facing end; an outer surface that is shaped and dimensioned to correspond to the shape and dimensions of the compressor air inlet inner surface, the outer surface extending between the air inlet-facing end and the wheel-facing end; and an inner surface. The inner surface includes an inwardly tapered portion adjoining the air inlet-facing end, and a concave portion disposed between the inwardly tapered portion and the wheel-facing end.

The noise attenuation device may include one or more of the following features: The the noise attenuation device is configured to be disposed coaxially within the air inlet in a manner such that a minimum diameter portion of the tapered portion is downstream with respect to direction of air flow through the air inlet relative to a maximum diameter portion, and the concave portion defines a smooth curve when viewed in cross section. The concave portion adjoins the tapered portion. The noise attenuation device is formed of a non-metal material. The concave portion is configured to redirect air flow between an axial direction and a radial direction.

In some aspects, an exhaust gas turbocharger includes a turbine section including a turbine wheel and a compressor section including a compressor housing defining an air inlet. A compressor wheel is disposed within the housing adjacent to the air inlet, and the compressor wheel is connected to the turbine wheel via a shaft. The turbocharger also includes an air flow-enhancing insert disposed in the air inlet. The insert includes a hollow, cylindrical inner member including a longitudinal axis and an outer surface; and lugs protruding outward from the outer surface of the inner member. Each lug has an elongated cross sectional shape and includes a leading edge, a trailing edge, and a long axis that extends between the leading edge and trailing edge. The long axis defines a helix about the outer surface, and an air recirculation channel is defined between the inner member outer surface, an inner surface of the air inlet, and the lugs.

The turbocharger may include one or more of the following features: The lugs are arranged so that the leading edge of one lug overlaps the trailing edge of an adjacent lug as seen when viewed along a line parallel to the longitudinal axis. The insert includes an outer member that surrounds the inner member, and a proximal end of each lug is connected to the inner member, and a distal end of each lug is connected to the outer member. The turbocharger further includes a noise attenuation device disposed in the air inlet at a location upstream of the insert. The noise attenuation device is a hollow member comprising an air-inlet facing end; a wheel-facing end opposed to the air-inlet facing end; an outer surface extending between the air-inlet facing end and the wheel-facing end, the outer surface conforming to the shape and dimensions of the air inlet; and an inner surface. The inner surface includes an inwardly tapered portion adjoining the air-inlet facing end, and a concave portion adjoining the wheel facing end. The concave portion is configured to redirect air flow between an axial direction and a radial direction.

In some aspects, an exhaust gas turbocharger includes a turbine section including a turbine wheel and a compressor section including a compressor housing defining an air inlet. A compressor wheel is disposed within the housing adjacent to the air inlet, and the compressor wheel is connected to the turbine wheel via a shaft. The turbocharger includes an air flow-enhancing insert disposed in the air inlet. The insert includes a hollow, cylindrical member including a longitudinal axis and an outer surface shaped and dimensioned to be fitted inside the compressor air inlet; and a groove formed in the outer surface that extends along a helical path. When the air flow-enhancing insert is disposed in the air inlet, the groove defines an air recirculation channel between the outer surface and an inner surface of the compressor air inlet.

The turbocharger may include one or more of the following features: The groove comprises a first helical groove arranged at a first angle relative to the longitudinal axis, and a second helical groove arranged at a second angle relative to the longitudinal axis, where the second angle is different from the first angle. The groove comprises a first helical groove arranged at a first angle relative to the longitudinal axis, and a second helical groove arranged at a second angle relative to the longitudinal axis, where the second angle is the negative of the first angle. The groove comprises groove pairs disposed on diametrically opposed sides of the member, each groove pair comprising a first helical groove arranged at a first angle relative to the longitudinal axis, and a second helical groove arranged at a second angle relative to the longitudinal axis, where the second angle is the negative of the first angle. The turbocharger further includes a noise attenuation device disposed in the air inlet at a location upstream of the insert. The noise attenuation device is a hollow member having an air-inlet facing end; a wheel-facing end opposed to the air-inlet facing end; an outer surface and an inner surface. The outer surface extends between the air-inlet facing end and the wheel-facing end, and conforms to the shape and dimensions of the air inlet. The inner surface includes an inwardly tapered portion adjoining the air-inlet facing end, and a concave portion adjoining the wheel facing end. The concave portion is configured to redirect air flow between an axial direction and a radial direction.

Engine speed varies during vehicle operation, whereby the amount of air required to be supplied to the engine also varies. When too much air is supplied to the engine, surge conditions can occur within the engine air intake system, and when too little air is supplied to the engine, choke conditions can occur within the engine air intake system. In order to avoid surge and choke conditions, the air flow-enhancing insert is disposed in the compressor air inlet to provide an air recirculation path that widens the pressure versus mass flow map that characterizes the compressor behavior, whereby the turbocharger becomes effective over a wider range of operating conditions. The insert has features which improve and smooth air flow within the compressor air inlet, resulting in reduced noised and increased efficiency relative to some conventional compressor air inlets 616 (FIG. 4) that include an air recirculation path 620 that is integrally formed in the compressor inlet wall surface 617. The recirculation path 620 may include a circumferentially-extending recirculation slot 624 formed in the compressor air inlet inner surface 617 that surrounds the leading edge of the compressor wheel 5 (not shown in FIG. 4), and an air passageway 622 formed in the compressor air inlet wall that connects the recirculation slot 624 to the air inlet 616 at a location upstream of the compressor wheel. The air recirculation path 620 relieves air pressure at the compressor wheel 5 by permitting a portion of air to be redirected away from the compressor wheel 5. However, such air recirculation paths 620 may direct undesirable noise toward the compressor air inlet opening, and, due to their inboard location within the air inlet, are relatively difficult to manufacture.

By using the insert to provide an air recirculation path within the compressor air inlet, an inner surface of the compressor air inlet can be formed having a uniform inner dimension without grooves or openings, whereby manufacture of the compressor section is simplified and manufacturing costs are reduced.

In addition, since the insert is formed separately from the compressor housing, modifications to, and customization of, the insert is easily achieved, permitting the turbocharger to be tuned to the requirements of a specific engine system more easily.

In some aspects, a noise attenuation device is provided that is formed separately from the air inlet of the compressor housing and is assembled in the compressor air inlet along with the insert to further reduce compressor noise. The air attenuation device includes a concave surface that faces the compressor wheel and serves to redirect sound waves away from the compressor inlet, whereby compressor noise is reduced.

Advantageously, forming the noise attenuation device as a separate insert is easier and less expensive than forming the noise attenuation device by casting the compressor housing with the noise attenuation device included as part of the air inlet. This is because the noise attenuation device provides an inwardly-tapered conical surface located at the inlet to the compressor wheel, a configuration that results in a relatively complex casting geometry that makes the removal of core sand very difficult. Similarly, the relatively complex casting geometry also makes it very difficult to remove swarf from the finished component. In additional to being difficult to cast, a full inspection of the cast components may be required to guarantee that all core sand and swarf have been removed, adding to the overall manufacturing cost.

Other objects and purposes of the invention, and variations thereof, will be apparent upon reading the following specification and inspecting the accompanying drawings.

DETAILED DESCRIPTION

Figure 1:
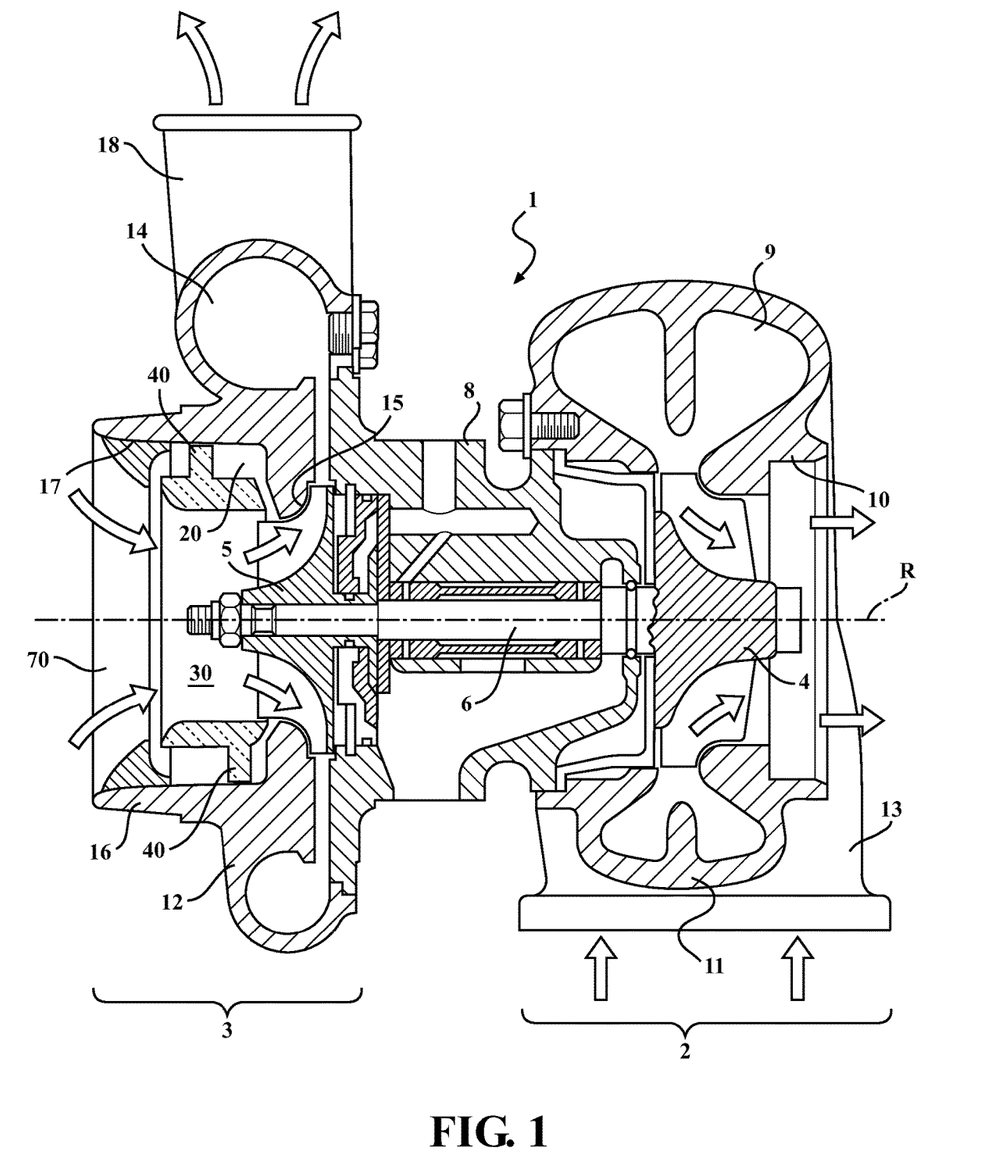
FIG. 1 is a side sectional view of an exhaust gas turbocharger including an air-flow enhancing insert disposed in the compressor air inlet.
Figure 2:
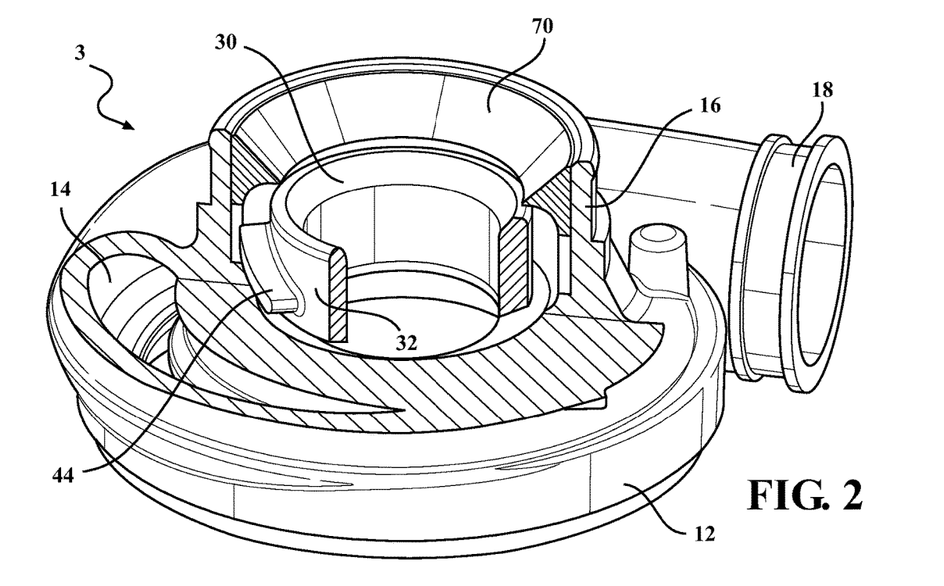
FIG. 2 is a perspective view of the compressor section of the turbocharger of FIG. 1, with portions of the compressor air inlet cut away and the compressor wheel omitted to show the insert disposed in the compressor air inlet.

Referring to FIGS. 1-2, an air inlet 16 of a compressor section 3 of an exhaust gas turbocharger 1 is formed without an integral air recirculation path, and an air recirculation path 20 is instead provided by placing an air flow-enhancing insert 30 within the air inlet 16. In particular, the air flow-enhancing insert 30 is disposed in the compressor air inlet 16, and cooperates with an inner surface 17 of the air inlet to form the air recirculation path 20. The insert 30 is a hollow cylindrical member formed independently (e.g., as a separate entity) from the compressor inlet 16, and is assembled therewith prior to use. The insert 30 has supporting lugs 44 that are shaped and positioned to improve air flow within the air inlet 16 and reduce noise, as discussed further below.

The exhaust gas turbocharger 1 includes a turbine section 2, the compressor section 3, and a center bearing housing 8 disposed between and connecting the compressor section 3 to the turbine section 2. The turbine section 2 includes a turbine housing 11 that defines an exhaust gas inlet 13, an exhaust gas outlet 10, and a turbine volute 9 disposed in the fluid path between the exhaust gas inlet 13 and exhaust gas outlet 10. A turbine wheel 4 is disposed in the turbine housing 11 between the turbine volute 9 and the exhaust gas outlet 10. A shaft 6 is connected to the turbine wheel 4, is rotatably supported within in the bearing housing 8, and extends into the compressor section 3. The compressor section 3 includes a compressor housing 12 that defines the air inlet 16, an air outlet 18, and a compressor volute 14. A compressor wheel 5 is disposed in the compressor housing 12 between the air inlet 16 and the compressor volute 14 at a location, referred to as the contour 15, at which the air flow path makes a 90 degree turn. The compressor wheel 5 is connected to the shaft 6.

In use, the turbine wheel 4 in the turbine housing 11 is rotatably driven by an inflow of exhaust gas supplied from the exhaust manifold of an engine. Since the shaft 6 is rotatably supported in the center bearing housing 8 and connects the turbine wheel 4 to the compressor wheel 5 in the compressor housing 12, the rotation of the turbine wheel 4 causes rotation of the compressor wheel 5. As the compressor wheel 5 rotates, it increases the air mass flow rate, airflow density and air pressure delivered to the engine's cylinders via an outflow from the compressor air outlet 18, which is connected to the engine's air intake manifold (not shown).

Figure 3:
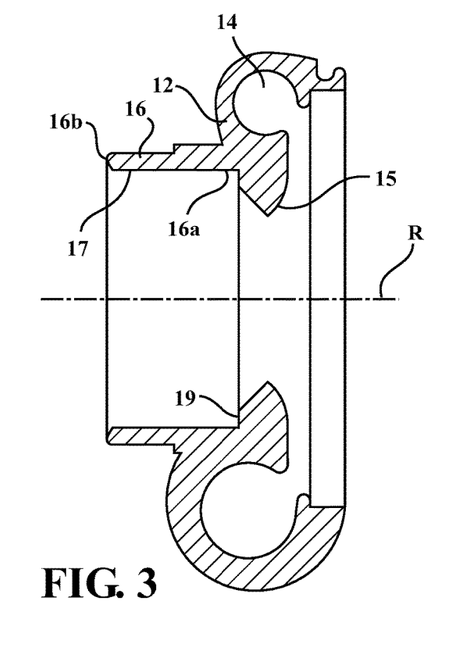
FIG. 3 is a side sectional view of the compressor section of FIG. 2 with the insert and compressor wheel omitted.
Figure 4:
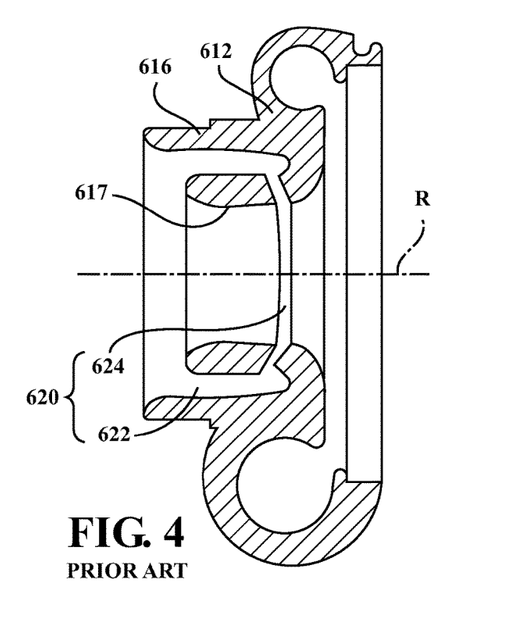
FIG. 4 is a side sectional view of a prior art compressor with the compressor wheel omitted, illustrating a conventional air recirculation path.

Referring to FIG. 3, the air inlet 16 is a hollow, cylindrical member that extends coaxially with the rotational axis R of the drive shaft 6. Adjacent to the contour 15, an inner end 16a of the air inlet 16 is surrounded by the compressor volute 14. The air inlet 16 protrudes from the compressor volute 14 so that an outer, terminal end 16b of the air inlet 16 is axially spaced apart from the compressor volute 14 along the rotational axis R. The inner surface 17 of the air inlet 16 has a uniform radial dimension between the terminal end 16b and the inner end 16a, and is formed without slots or openings in this region. The radial dimension of the inner surface is greater than that of the contour 15 so that a terminal end-facing shoulder 19 is formed at the intersection of the inner end 16a and the contour 15, which occurs at the leading edge of the compressor wheel 5. Because the inner surface 17 has a uniform radial dimension, and is formed without slots or openings, the manufacture of the compressor housing is simplified, and assembly of the air flow enhancing insert 30 with the compressor inlet 16 is also simplified relative to some conventional compressor air inlets 616 (i.e., such as shown in FIG. 4 and described above).

Figure 5:
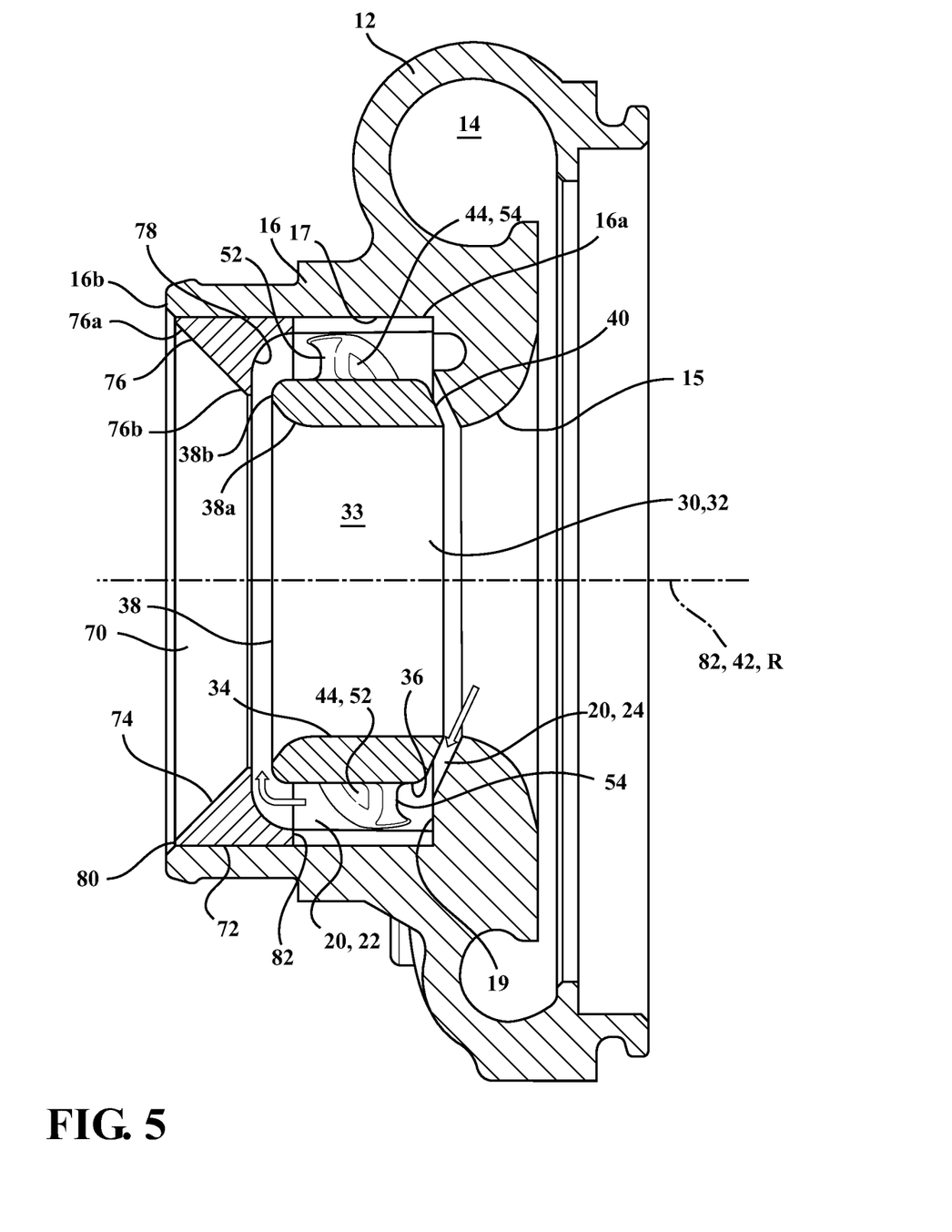
FIG. 5 is a side sectional view of the compressor air inlet including the insert and a noise attenuation device disposed in the compressor air inlet.
Figure 6:
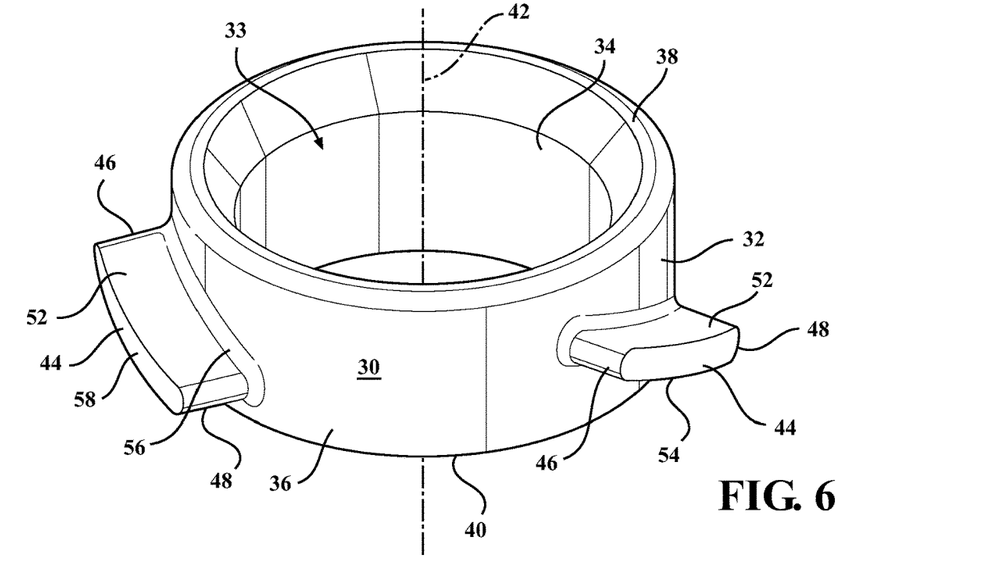
FIG. 6 is a perspective view of the insert of FIG. 5.
Figure 7:
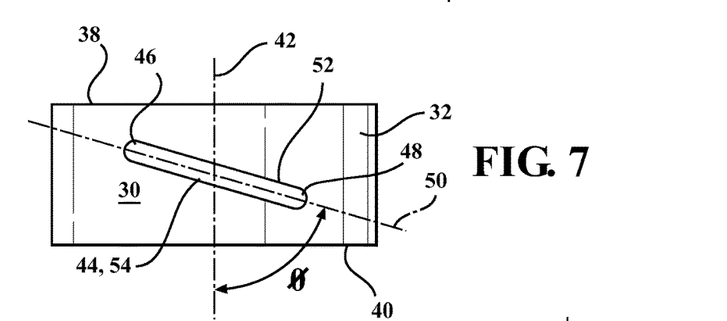
FIG. 7 is a side view of the insert of FIG. 5.

Referring also to FIGS. 5-7, the insert 30 includes a hollow, cylindrical inner member 32 that is radially spaced apart from the compressor inlet inner wall 17, and lugs 44 that protrude outward from an outer surface 36 of the inner member 32. The inner member 32 has a first end 38 that faces the compressor air inlet terminal end 16b, and a second end 40 that is opposed to the first end 38 and faces the shoulder 19 and compressor wheel 5. The inner member 32 also has a longitudinal axis 42 that extends between the first and second ends 38, 40, and is coaxial with the shaft rotational axis R. The first end 38 is rounded to facilitate smooth air flow into a main air flow passageway 33 defined by an inner surface 34 of the insert 30, and subsequently, into the compressor wheel 5. The insert second end 40 is tapered so that the inner surface 34 extends axially toward the compressor wheel 5 to a greater extent than the outer surface 36.

The lugs 44 protrude outward from the outer surface 36 in a direction perpendicular to the outer surface 36. Each lug 44 is provided with an elongated cross-section that includes a broad inlet-facing surface 52 and a broad wheel-facing surface 54 that is opposed to the inlet-facing surface 52. The inlet-facing and wheel-facing surfaces 52, 54 are relatively long compared to the thickness t of the lug 44, and are generally parallel to a long axis 50 of the lug 44, where the long axis 50 extends between a lug leading edge 46 and a lug trailing edge 48. The lug 44 has a gradually decreasing thickness (e.g., is rounded) at the leading edge 46 and the trailing edge 48 to facilitate smooth air flow between the inner member outer surface 36 and the compressor inlet inner surface 17, whereby the cross sectional shape of the lug 44 is generally elliptical.

In the illustrated embodiment, three equidistantly-spaced lugs 44 are provided, each lug 44 having a length (e.g., the distance between the leading edge 46 and the trailing edge 48) corresponding to about one-sixth of the circumference of the inner member 32.

In order to minimize impairment of rotational air flow, and to encourage axial air flow, the lug 44 is arranged so that the lug long axis 50 is oriented at a deflection angle (FIG. 7) relative to inner member longitudinal axis 42. As a result, each lug 44 is arranged on the outer surface 36 so that the lug long axis 50 lies along a helix of the inner member 32. As used herein, the term "helix" refers to the curve formed by a straight line drawn on a plane when that plane is wrapped around a cylindrical surface. In some embodiments, the deflection angle is in the range of 55 degrees to 85 degrees. In other embodiments, the deflection angle is in the range of 60 degrees to 80 degrees. In the illustrated embodiment, the deflection angle is about 70 degrees. Due to the helical configuration of the lug 44, the air flow includes a component directed in a circumferential (tangential) direction of the inner member 32, that is, a rotational component about the inner member longitudinal axis 42, as well as a component along the axial direction of the inner member 32.

The lugs 44 extend across the gap between the inner member outer surface 36 and the compressor inlet inner wall 17 that defines an air passageway 22, and the lug distal ends 58 may be secured to the compressor inlet inner wall 17 by conventional methods including adhesive and/or pins. The lugs 44 are secured to the compressor inlet inner wall 17 in such a manner that the tapered second end 40 of the insert inner member 32 is axially spaced apart from the shoulder 19. This spacing provides a circumferentially-extending recirculation slot 24 at the leading edge of the compressor wheel 5. The slot 24 communicates with the air passageway 22, whereby the slot 24 and air passageway together form an air recirculation path 20 that opens to the air inlet 16 at a location upstream of the compressor wheel 5.

The insert 30, including the inner member 32 and supporting lugs 44, is positioned in the air inlet 16 adjacent to a leading edge of the compressor wheel 5 to create the air recirculation path 20. The insert 30 improves aerodynamic efficiency and reduces noise in the recirculation path 20 by eliminating sharp corners and abrupt changes in direction of air flow. For example, the lugs 44 are rounded in shape and arranged on the inner member 32 so that the lug long axis 50 lies along a helix of the inner member 32, whereby better air flow is promoted.

Figure 8:
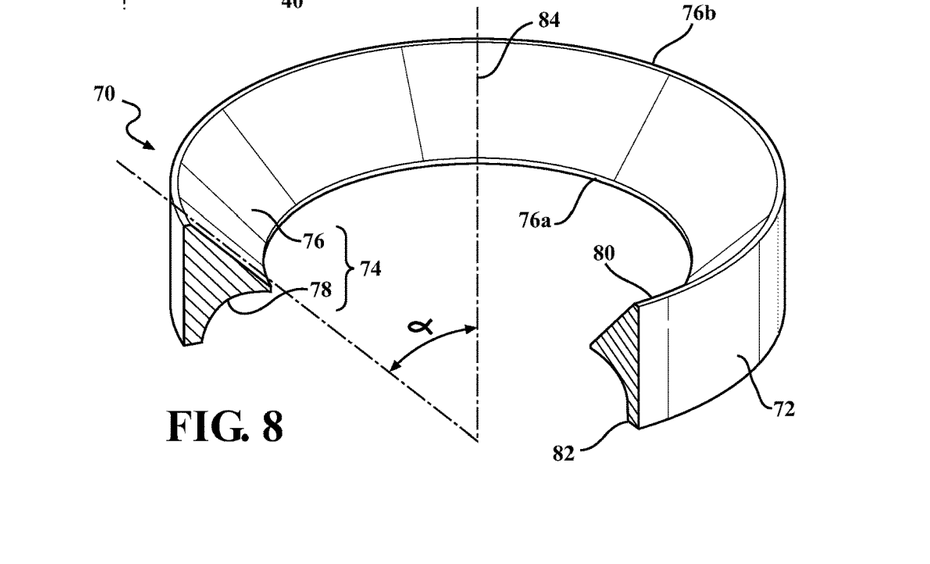
FIG. 8 is a partially cut-away perspective view of the noise attenuation device of FIG. 5.

Referring to FIGS. 5 and 8, a noise attenuation device 70 is used to further reduce turbocharger compressor noise. The noise attenuation device 70 is an insert that is assembled on the air inlet terminal end 16b subsequent to assembly of the insert 30 and prior to assembly of an air intake pipe (not shown) about an outer surface of the compressor air inlet 16.

The noise attenuation device 70 is formed independently (e.g., as a separate entity) from the compressor inlet 16, and is a generally hollow cylindrical member having an outer surface 72 and an irregularly-shaped inner surface 74 opposed to the outer surface 72. The outer surface 72 is shaped and dimensioned to correspond to the shape and dimensions of the compressor air inlet inner surface 17, and extends between an inlet-facing end 80 and an opposed wheel-facing end 82. In the illustrated embodiment, the outer surface 72 is cylindrical. The inner surface 74 includes a tapered portion 76 that adjoins the air inlet-facing end 80 of the device 70, and a concave portion 78 that extends between the tapered portion 76 and the wheel-facing end 82 of the device 70. The tapered portion 76 has a maximum dimension at the air inlet-facing end 80, tapers inward between the air inlet-facing end 80 and the concave portion 78, and has a minimum diameter at its intersection with the concave portion 78. Within the tapered portion 76, the inner surface 74 defines an angle $\square$ relative to the device longitudinal axis 84. The angled inner surface serves to smoothly direct air into the main air flow passageway 33 and thus into the compressor wheel 5, reducing losses. The angle $\square$ is in a range of 5 degrees to 25 degrees. In the illustrated embodiment, the angle $\square$ is 15 degrees. In addition, the concave portion 78 defines a smooth curve (e.g., an arc) when viewed in cross section.

The noise attenuation device 70 is configured to be disposed coaxially with the shaft rotational axis R within the air inlet 16 in a manner such that the minimum dimension portion 76b of the tapered portion 76 is downstream with respect to direction of air flow through the compressor air inlet 16 (indicated by an arrow in FIG. 5) relative to the maximum dimension portion 76a.

In addition, the noise attenuation device 70 is inserted into the air inlet 16 to an extent that the wheel-facing end 82 is axially aligned with the first end 38 of the insert 30. In this configuration, the concave portion 78 is spaced apart from and surrounds an outer portion 38b of the insert first end 38. The smoothly curving contours of the concave portion 78 and the rounded first end 38 gently redirect recirculated air from a generally axial flow toward a centerline of the air inlet. The smoothly curving contours of the concave portion 78 also serve to block the flow of sound along the axial direction. In addition, the angle $\square$ defined by the tapered portion 76 is continued along an inner portion 38a of the insert first end 38, whereby the inlet air flow is smoothly directed through the main air flow passageway 33 of the insert 30 toward the compressor wheel 5.

In some embodiments, the noise attenuation device 70 is formed of an elastic material. For example, the noise attenuation device 70 may be formed of molded rubber. Using an elastic material is advantageous relative to using metal since an elastic material facilitates assembly and function of the noise attenuation device 70. In particular, any movement of the rubber noise attenuation device 70 within the air inlet 16 during operation (for example due to engine or turbocharger vibration) would be relatively quiet compared to a noise attenuation device that was formed of metal.

The insert 30 and noise attenuation device 70 can be separately machined or molded parts, which allows for ease of production, testing, assembly and/or tailoring of parts for specific turbocharger applications. It is contemplated, however, that these parts may be formed as integral or combined components.

Although the insert 30 is described as being secured to the compressor inlet inner wall 17 by conventional methods including adhesive and/or pins, it is not limited to this configuration. For example, in some embodiments where a noise attenuation device is assembled on the air inlet facing side of the insert 30, the adhesive and/or pins may be used to secure the noise attenuation device 70 rather than the insert 30, and the noise attenuation device 70 serves to retain the insert 30 in the desired location within the compressor air inlet 16. In another example, the insert 30 is fixed to, or made integral with, the noise attenuation device 70.

Figure 9:
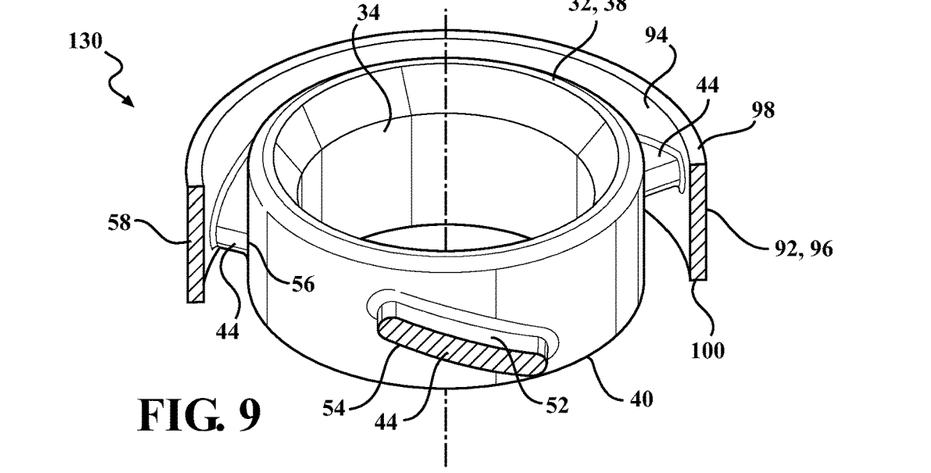
FIG. 9 is a partially cut-away perspective view of an alternative embodiment insert.
Figure 10:
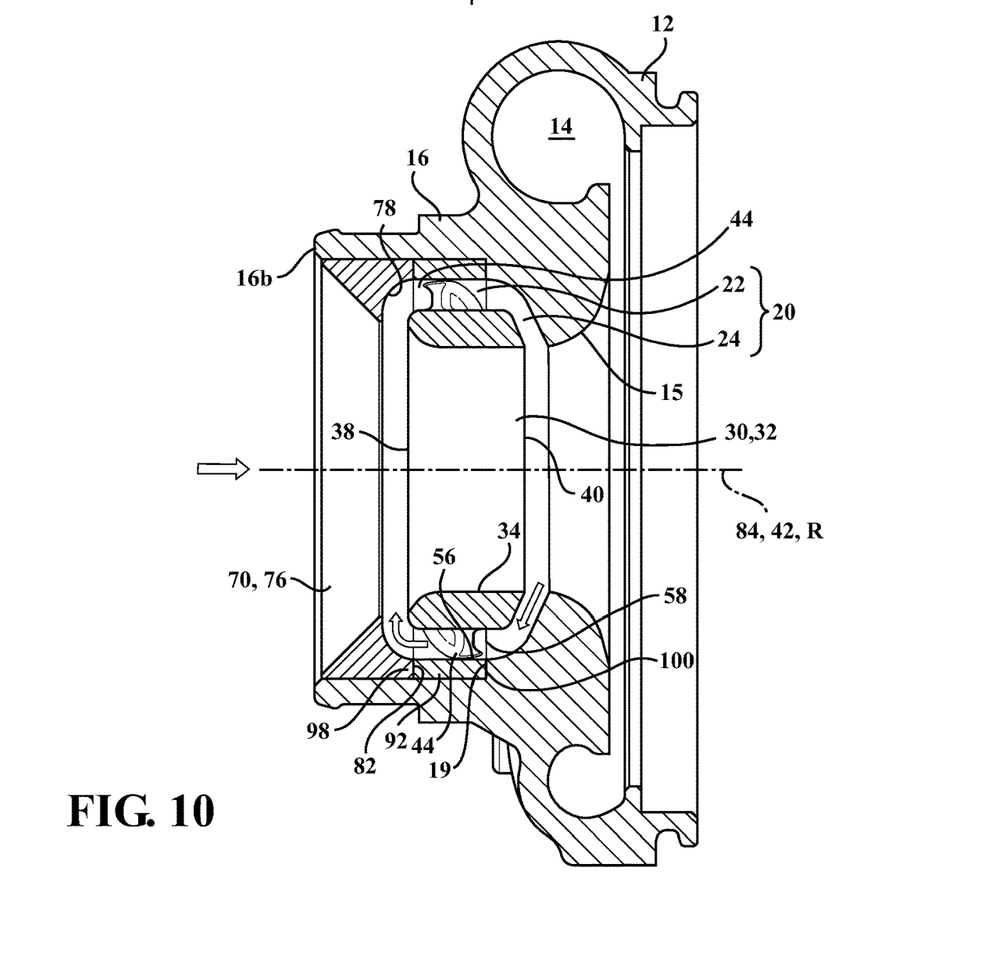
FIG. 10 is a side sectional view of the compressor air inlet including the insert of FIG. 9 and the noise attenuation device of FIG. 8 disposed in the compressor air inlet.

Referring to FIGS. 9-10, an alternative embodiment air flow-enhancing insert 130 may be assembled with the compressor air inlet 16 to improve air flow within the air inlet 16 and reduce noise. The insert 130 is a hollow cylindrical member formed independently (e.g., as a separate entity) from the compressor inlet 16, and is assembled therewith prior to use. Like the above-described insert 30, the insert 130 cooperates with the compressor air inlet inner surface 17 to form the air recirculation path 20. The insert 130 is similar to the above-described insert 30, and common reference numbers are used to refer to elements that are common to both embodiments. Like the above described insert 30, the insert 130 includes the inner member 32 that is radially spaced apart from the compressor inlet inner wall 17, and the lugs 44 that protrude outward from an outer surface 36 of the inner member 32. The insert 130 differs from the above-described insert 30 in that it further includes a hollow, cylindrical outer member 92 that surrounds both the inner member 32 and the lugs 44. The outer member 92 is coaxial with the inner member 32, and is connected to the inner member 32 via the lugs 44.

The outer member 92 has an inner surface 94 and an opposed outer surface 96. The outer surface 96 is shaped and dimensioned to correspond to the shape and dimensions of the compressor air inlet inner surface 17. In the illustrated embodiment, the inner and outer surfaces 94, 96 are cylindrical.

The outer member 92 has a first end 98 that faces the compressor air inlet terminal end 16b, and a second end 100 that is opposed to the first end 98 and faces the shoulder 19 and compressor wheel 5. The outer member first and second ends 98, 100 are substantially flat to provide stable abutting surfaces. In particular, when the insert 130 is assembled within the compressor air inlet 16, the second end 100 abuts the shoulder 19, which serves as a stop that axially locates the air flow enhancing insert 130 within the compressor air inlet 16. In addition, the first end 98 abuts and axially locates the noise reduction device wheel-facing end 82.

The inner member 32 is supported coaxially within the outer member 92 by the lugs 44 which extend across the gap between the inner member outer surface 36 and the outer member inner surface 94 that defines the air passageway 22. In particular, a proximal end 56 of each lug 44 is connected to the inner member 32, and a distal end 58 of each lug 44 is connected to the outer member 92. The outer member outer surface 96 may be secured to the compressor inlet inner wall 17 by conventional methods including adhesive and/or pins.

The outer wall thickness (e.g., the radial distance between the inner surface 94 and the outer surface 96) corresponds to the radial depth of the shoulder 19, so that when the insert 130 is positioned within the compressor air inlet with the second end 100 in contact with the shoulder 19, the air passageway 22 defined between the inner member 32 and outer member 92 has a substantially smooth surface promoting smooth air flow therewithin. As in the previous embodiment, the circumferentially-extending recirculation slot 24 is defined between the tapered second end 40 of the inner member 32 and the shoulder 19. The slot 24 communicates with the air passageway 22, whereby the slot 24 and air passageway 22 together form the air recirculation path 20 that opens to the air inlet 16 at a location upstream of the compressor wheel 5.

The insert 130, including the inner member 32, outer member 92 and the supporting lugs 44, is positioned in the air inlet 16 adjacent to a leading edge of the compressor wheel 5 to create the air recirculation path 20. The insert 130 improves aerodynamic efficiency and reduces noise in the recirculation path 20 by eliminating sharp corners and abrupt changes in direction of air flow.

Figure 11:
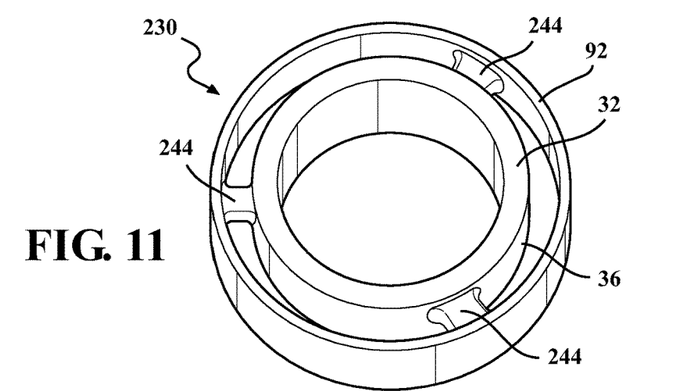
FIG. 11 is perspective view of another alternative embodiment insert.

Referring to FIG. 11, although the inserts 30, 130 are described as having three equidistantly-spaced lugs 44, each lug 44 having an elongated cross-section and a length corresponding to about one-sixth of the circumference of the inner member 32, the inserts 30, 130 are not limited to lugs 44 having this configuration. For example, an alternative insert 230 may include three equidistantly-spaced lugs 244, each lug 244 having a circular cross-section and a length corresponding to about five percent of the circumference of the inner member 32. In other respects, the insert 230 is similar to the above-described insert 30, and common reference numbers are used to refer to elements that are common to both embodiments.

Figure 12:
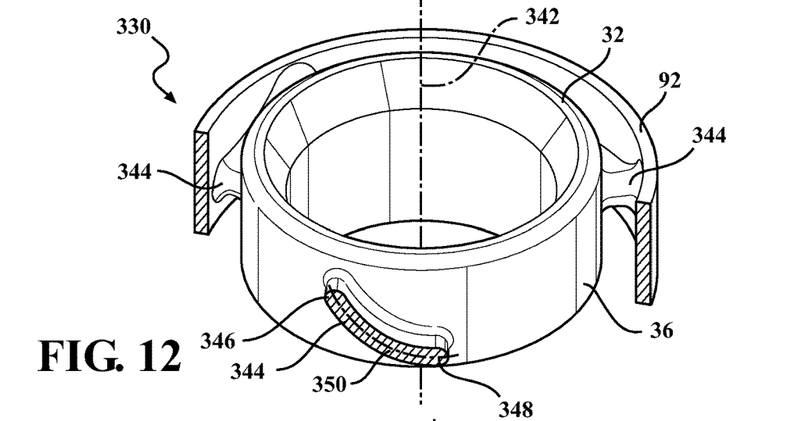
FIG. 12 is a partially cut-away perspective view of another alternative embodiment insert.

Referring to FIG. 12, although the insert 30, 130 are described as having lugs 44 arranged on the inner member outer surface 36 so that the lug long axis 50 lies along a helix of the inner member 32, the lugs 44 are not limited to this configuration. For example, another alternative insert 330 may include lugs 344 arranged so that the long axis 350 of the lug cross section lies along a modified helix of the inner member 32. As used herein, the "modified helix" refers to the curve formed by a curved line drawn on a plane when that plane is wrapped around a cylindrical surface. As a result, the lug long axis 350 is arcuate, so that a leading edge 346 of the lug 344 is substantially aligned with the insert longitudinal axis 342, and a trailing edge 348 of the lug 344 is substantially aligned with an axis transverse to the insert longitudinal axis 342 (e.g., the circumferential direction). The arcuate shape of the lug 344 promotes a gradual redirection of air flow between axial flow and circumferential flow. In other respects, the insert 330 is similar to the above-described insert 30, and common reference numbers are used to refer to elements that are common to both embodiments.

Figure 13:
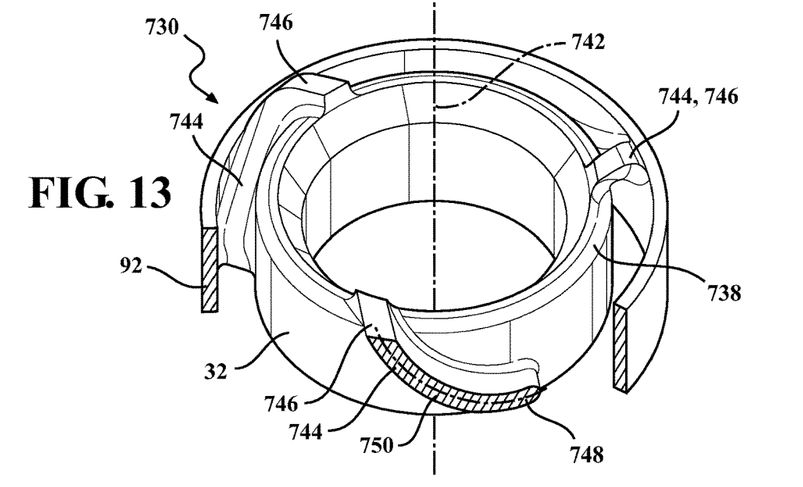
FIG. 13 is a partially cut-away perspective view of another alternative embodiment insert.

Referring to FIG. 13, like the insert 330, another alternative insert 730 also includes lugs 744 arranged so that the long axis 750 of the lug cross section lies along a modified helix of the inner member 32. As a result, the lug long axis 750 is arcuate, so that a leading edge 746 of the lug 744 is substantially aligned with the insert longitudinal axis 742, and a trailing edge 748 of the lug 744 is substantially aligned with an axis transverse to the insert longitudinal axis 342 (e.g., the circumferential direction). Unlike the insert 330, in the insert 730, the lug leading edge 746 extends along the lug long axis 750 beyond an inlet-facing end 738 of the lug inner member 732 and wraps onto the lug inlet-facing end 738. In other respects, the insert 330 is similar to the above-described insert 30, and common reference numbers are used to refer to elements that are common to both embodiments.

The arcuate shape of the lug 744 promotes a gradual redirection of air flow between axial flow and circumferential flow. Because the lug 744 wraps over the lug inlet-facing end 738, the lug 744 directs air into the noise reduction device 70, and cooperates with the concave portion 78 of the noise reduction device 70 to redirect airflow radially inward.

Figure 14:
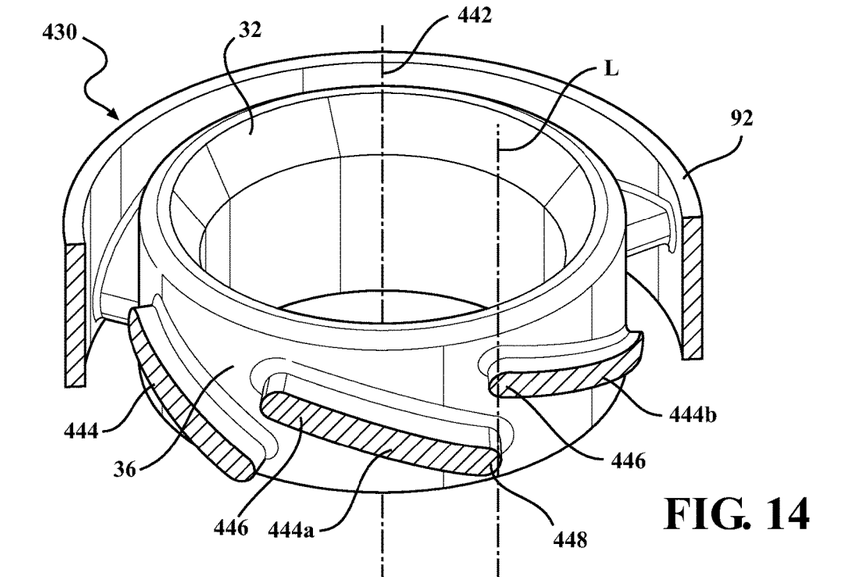
FIG. 14 is a partially cut-away perspective view of another alternative embodiment insert.

Referring to FIG. 14, although the inserts 30, 130 are described as having three equidistantly-spaced lugs 44, each lug 44 having a length corresponding to about one-sixth of the circumference of the inner member 32, the inserts 30, 130 are not limited to lugs 44 having this configuration. For example, an alternative insert 430 includes six equidistantly-spaced lugs 444, each lug 444 having an elongated cross-section and a length corresponding to about one-sixth of the circumference of the inner member 32. The lugs 444 are arranged on the inner member outer surface 36 so that the lug long axis 450 lies along a helix of the inner member 32. In addition, the lugs 444 are arranged so that the leading edge 446 of each lug 444 (for example, lug 444b) overlaps the trailing edge 448 of the adjacent lug 444 (for example, lug 444a) as seen when viewed along a line L parallel to the insert longitudinal axis 442.

By providing lugs 444 that are overlapping when viewed along the line L, there is no direct path for sound waves to travel up the compressor inlet 16 toward the compressor inlet terminal end 16b. In this configuration, the lugs 444 disrupt the sound wave and may reflect the sound wave back toward the compressor wheel, reducing noise produced by the turbocharger. By employing an insert 430 including the overlapping lugs 444, it is possible to omit the noise attenuation device 70 from the compressor assembly, whereby turbocharger costs and overall size may be reduced.

In other respects, the insert 430 is similar to the above-described insert 30, and common reference numbers are used to refer to elements that are common to both embodiments.

Figure 15:
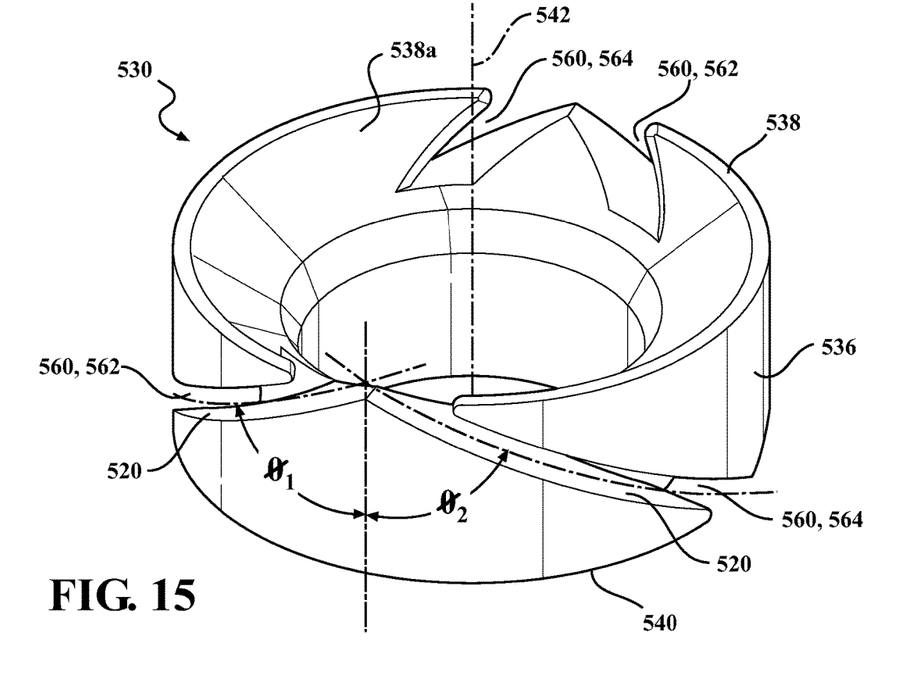
FIG. 15 is a perspective view of another alternative embodiment insert.
Figure 16:
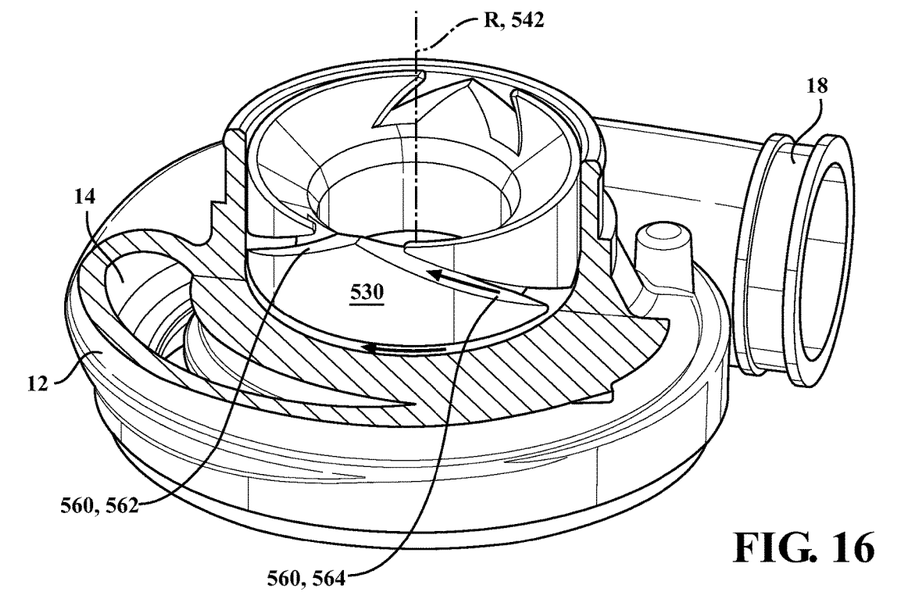
FIG. 16 is a perspective view of the compressor section of the turbocharger of FIG. 1, with portions of the compressor air inlet cut away and the compressor wheel omitted to show the insert of FIG. 16 disposed in the compressor air inlet, with arrows indicating the direction of air flow in compressor surge conditions.
Figure 17:
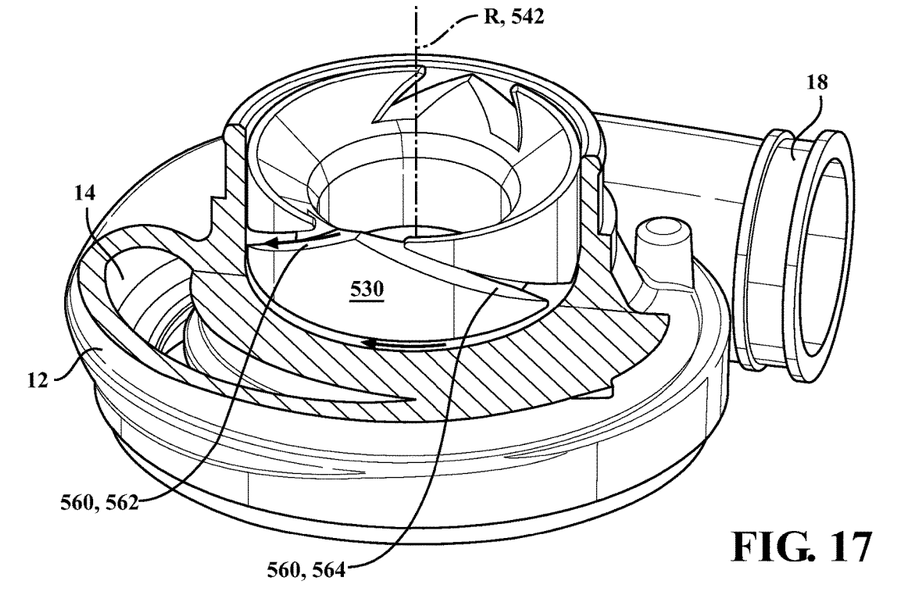
FIG. 17 is a perspective view of the compressor section of the turbocharger of FIG. 1, with portions of the compressor air inlet cut away and the compressor wheel omitted to show the insert of FIG. 16 disposed in the compressor air inlet, with arrows indicating the direction of air flow in compressor choke conditions.

Referring to FIGS. 15-17, another alternative insert 530 includes a hollow, cylindrical member that is thick-walled relative to the inner member 32 described above. The insert 530 has a first end 538 that faces the compressor air inlet terminal end 16b, and a second end 540 that is opposed to the first end 538 and abuts the shoulder 19. The insert 530 also has a longitudinal axis 542 that extends between the first and second ends 538, 540, and is coaxial with the shaft rotational axis R. An inner portion 538a of the first end 538 is rounded to facilitate smooth air flow into the main air flow passage 533 of the insert 530, and subsequently, into the compressor wheel 5. The second end 540 is tapered so that an inner surface 534 of the insert 530 extends axially toward the compressor wheel 5 to a greater extent than the insert outer surface 536. The outer surface 536 is shaped and dimensioned to correspond to the shape and dimensions of the compressor air inlet inner surface 17.

Grooves 560 are formed on the outer surface 536 to provide air recirculation pathways 520 along the compressor air inlet inner surface 17. The grooves 560 are arranged on the insert outer surface 536 so that each groove 560 lies along a helix of the insert 530. The grooves 560 are arranged in pairs, each pair including a first groove 562 having a first helix angle 1 relative to the longitudinal axis 542 and a second groove 564 having a second helix angle 2 relative to the longitudinal axis 542, where the first helix angle 1 is at a positive angle relative to the longitudinal axis 542, and the second helix angle 2 is at a negative angle relative to the longitudinal axis 542. In some embodiments, 1 is the opposite of 2, (e.g., 1=(−2)). Although two groove pairs 562, 564 are illustrated, a fewer or greater number of groove pairs may be provided, depending on the requirements of the specific application and by adjusting the helix angles 1, 2. In addition, the leading and trailing edges of the grooves 560 are rounded to eliminate sharp corners which may generate noise.

Because there is no direct path for sound to travel up the compressor inlet 16 toward the compressor inlet terminal end 16b, noise produced by the turbocharger is reduced. By employing an insert 530 including the helical groove pairs 562, 564, it is possible to omit the noise attenuation device 70 from the compressor assembly (FIGS. 16-17), whereby turbocharger costs and overall size may be reduced.

In addition, during compressor surge conditions, excess air can bleed out through the grooves 564, travelling from the second end 540 toward the first end 538, with a minimum disturbance to air flow (FIG. 16). The groove angle 2 ensures that air is smoothly redirected from a circumferential air flow about the compressor wheel 5 to a more axial air flow at the air inlet 16.

During compressor choke conditions, air can enter the compressor wheel via the grooves 562, travelling from the first end 538 toward the second end 540 (FIG. 17). The groove angle ensures that air is travelling in the correct direction to smoothly join circumferentially flowing air at the compressor wheel 5.

Although the grooves 560 are arranged on the insert outer surface 536 so that each groove 560 lies along a helix of the insert 530, the grooves are not limited to this configuration. For example, in some embodiments, the grooves 560 may lie along a modified helix of the insert 530.

Although the lugs 44 and grooves 560 are illustrated herein as being equidistantly spaced apart, the lugs 44 and grooves 560 are not limited to this configuration. In some embodiments, the lugs 44 are irregularly spaced apart about the circumference of the inner member 32, or the grooves are irregularly spaced apart about the outer surface 536, which may help to avoid pulsating air flow and its corresponding noise.

Although particular preferred embodiments of the invention have been disclosed in detail for illustrative purposes, it will be recognized that variations or modifications of the disclosed apparatus, including the rearrangement of parts, lie within the scope of the present invention.

I claim:
1. An exhaust gas turbocharger comprising:
a turbine section including a turbine wheel;
a compressor section including a compressor housing defining an air inlet;
a compressor wheel disposed within the compressor housing adjacent to the air inlet, the compressor wheel connected to the turbine wheel via a shaft;
an air flow-enhancing insert disposed in the air inlet, the insert comprising
a hollow, cylindrical inner member including a longitudinal axis and an outer surface; and
a plurality of lugs protruding outward from the outer surface of the inner member, each lug having an elongated cross sectional shape and including a leading edge, a trailing edge, and a long axis that extends between the leading edge and trailing edge, the long axis defining a helix about the outer surface, wherein the plurality of lugs are arranged so that the leading edge of one lug overlaps the trailing edge of an adjacent lug as seen when viewed along a line parallel to the longitudinal axis; and
wherein an air recirculation channel is defined between the inner member outer surface, an inner surface of the air inlet, and the plurality of lugs.
2. The turbocharger of claim 1 wherein the insert includes an outer member that surrounds the inner member, and a proximal end of each lug is connected to the inner member, and a distal end of each lug is connected to the outer member.

3. The turbocharger of claim 1 further comprising a noise attenuation device disposed in the air inlet at a location upstream of the insert.

4. The turbocharger of claim 3, wherein the noise attenuation device is a hollow member comprising
an air-inlet facing end;
a wheel-facing end opposed to the air-inlet facing end;
an outer surface extending between the air-inlet facing end and the wheel-facing end, the outer surface conforming to the shape and dimensions of the air inlet; and
an inner surface that includes an inwardly tapered portion adjoining the air-inlet facing end, and a concave portion adjoining the wheel facing end.

5. The turbocharger of claim 4, wherein the concave portion is configured to redirect air flow between an axial direction and a radial direction.

6. The turbocharger of claim 1, wherein each lug defines a modified helix about the outer surface.

7. The turbocharger of claim 1 wherein the helix is defined on a plane extending along a circumference of the outer surface of the inner member.

8. The turbocharger of claim 1 wherein the plurality of lugs extend between a gap defined between the outer surface of the inner member and the inner surface of the air inlet.

9. The turbocharger of claim 8 wherein the plurality of lugs are secured to the inner surface of the air inlet.

10. The turbocharger of claim 1 wherein the compressor section further comprises a volute, wherein the compressor wheel is disposed between the air inlet and the volute at a contour of the compressor section constructed and arranged to cause an air flow path to make a 90 degree turn; wherein the air inlet comprises a first end adjacent to the contour and surrounded by the volute and a second end axially spaced from the volute, wherein a radial dimension of the inner surface of the air inlet is greater than a radial dimension of the contour so that a shoulder is formed in the compressor section at an intersection of the second end of the air inlet and the contour; wherein the leading edge of each of the plurality of lugs is axially spaced from the shoulder and defines a slot; and wherein the outer surface of the inner member and the inner surface of the air inlet define an air passageway, and wherein the slot and the air passageway define the air recirculation channel that opens to the air inlet upstream of the compressor wheel.

11. An exhaust gas turbocharger comprising:
a turbine section including a turbine wheel;
a compressor section including a compressor housing defining an air inlet;
a compressor wheel disposed within the compressor housing adjacent to the air inlet, the compressor wheel connected to the turbine wheel via a shaft;
an air flow-enhancing insert disposed in the air inlet, the insert comprising
a hollow, cylindrical member including a longitudinal axis and an outer surface shaped and dimensioned to be fitted inside the compressor air inlet; and
a groove formed in the outer surface that extends along a helical path, wherein the groove comprises groove pairs disposed on diametrically opposed sides of the member, each groove pair comprising a first helical groove arranged at a first angle relative to the longitudinal axis, and a second helical groove arranged at a second angle relative to the longitudinal axis, where the second angle is the negative of the first angle; and
wherein when the air flow-enhancing insert is disposed in the air inlet, the groove defines an air recirculation channel between the outer surface of the cylindrical member and an inner surface of the compressor air inlet.

12. The turbocharger of claim 11 further comprising a noise attenuation device disposed in the air inlet at a location upstream of the insert.

13. The turbocharger of claim 12, wherein the noise attenuation device is a hollow member comprising
an air-inlet facing end;
a wheel-facing end opposed to the air-inlet facing end;
an outer surface extending between the air-inlet facing end and the wheel-facing end, the outer surface conforming to the shape and dimensions of the air inlet; and
an inner surface that includes an inwardly tapered portion adjoining the air-inlet facing end, and a concave portion adjoining the wheel-facing end.

14. The turbocharger of claim 13, wherein the concave portion is configured to redirect air flow between an axial direction and a radial direction.

15. An exhaust gas turbocharger comprising:
a turbine section including a turbine wheel;
a compressor section including a compressor housing defining an air inlet;
a compressor wheel disposed within the compressor housing adjacent to the air inlet, the compressor wheel connected to the turbine wheel via a shaft;
an air flow-enhancing insert disposed in the air inlet, the insert comprising
a hollow, cylindrical member including a longitudinal axis and an outer surface shaped and dimensioned to be fitted inside the compressor air inlet; and
a groove formed in the outer surface that extends along a helical path,
wherein when the air flow-enhancing insert is disposed in the air inlet, the groove defines an air recirculation channel between the outer surface of the cylindrical member and an inner surface of the compressor air inlet, and wherein the groove comprises a first helical groove arranged at a first angle relative to the longitudinal axis, and a second helical groove arranged at a second angle relative to the longitudinal axis, where the second angle is different from the first angle.

16. The turbocharger of claim 15, wherein the second angle is the negative of the first angle.

* * * * *